3,066,012
PROCESS FOR PREPARING ALUMINA GELS
Charles P. Wilson, Jr., Cincinnati, Ohio, and Frank G. Ciapetta, Silver Spring, and James W. Elston, Jr., Baltimore, Md., assignors to W. R. Grace & Co., New York, N.Y., a corporation of Connecticut
No Drawing. Filed Apr. 4, 1960, Ser. No. 19,514
6 Claims. (Cl. 23—143)

This invention relates to alumina gels and, more specifically, to a process for preparing alumina gels having low soda content and high pore volume and high surface area.

Hydrous alumina or alumina gel is generally formed by adding ammonia or alkali to a solution of a suitable salt, such as aluminum chloride. The precipitant is very voluminous and appears to be colloidal in form. The gel appears to contain not over 10% of alumina, the balance water. In this form it is the most reactive of the hydrous aluminas and combines with both acid and alkali. The gel can be dried to a hard glass-like material and activated by heating. It has high surface area, which makes it useful as an adsorbent and catalyst or catalyst support.

The extent of the surface area of the alumina is dependent upon its mode of preparation and degree of activation. Commercial forms have surface areas ranging from 100 to 400 m.$^2$/g. and most of the types contain soda as an impurity. An alumina having a high soda content finds little or no application as adsorbents or catalysts because the soda-contaminated alumina fails to withstand high reactivation temperatures.

Although satisfactory alumina gels can be obtained on a laboratory scale by precipitation of alumina from an aluminum salt, such as alum, using techniques incorporating ammonia and soda ash as precipitating agents, such procedures are impractical or impossible in commercial practices. When alumina is freshly precipitated by the addition of ammonia, difficulty is frequently encountered in filtering the slurry. Although filtration of small batches on a bench scale can be accomplished, continuous commercial operation becomes extremely difficult and costly becouse of blinding of the filter cloth. These filtration difficulties prevent the adequate removal of ammonium sulfate which is formed in preparing the alumina gel.

Although the ammonium sulfate can be more readily washed from the alumina gel after its gelatinous character has been modified prior to drying, the obstacles presented in commercial scale drying of freshly precipitated alumina in the presence of ammonium sulfate are even more insurmountable than those presented in the continuous filtration of the undried gel. Firstly, during spray drying, ammonium sulfate volatilizes into the flue gas and when present in excessive quantities it presents a nuisance where catalyst plants are located in populated areas. Secondly, the ammonium sulfate readily decomposes into objectionable gaseous ammonia with the consequent liberation of free sulphuric acid and which attacks the freshly precipitated aluminum trihydrate to form various water soluble sulfates of alumina. For example, during commercial drying of an alumina gel slurry which was precipitated by an excess of ammonia to pH of 8.0, the pH of the dried product dropped to 4.0. At the latter pH, approximately 55% of the added ammonia had been evolved from the spray dried product and about ¼ the amount of input ammonia reverted back to free ammonia which passed through the exhaust stack with the flue gas.

Apart from economic reasons, the loss of ammonia renders the spray dried product unstable. In general, when drying aluminas which have been in whole or in part precipitated by ammonia, or soda ash, the pH of the dried product must not be less than 4.3 and preferably above 4.5 in order to eliminate the presence of objectionable basic sulfates which hydrolyze to form gelatinous alumina floc. The presence of the latter prevents washing by decantation or filtration procedures. Alumina gels precipitated entirely by soda ash are also difficult to filter prior to drying. Although the pH of such gels remains stable during drying, the dried products are too low in density and too soft to find commercial acceptance.

It is, therefore, an object of the invention to provide a practical commercial process for preparing alumina gels from alum solutions wherein the density and hardness of the final gel is satisfactory and which at the same time possess exceptionally high pore volume and high surface area and low soda content. This objective is realized by adding an aqueous slurry of calcium carbonate to aluminum sulfate solutions (alum), separating the resulting basic aluminum sulfate sol, adding sodium carbonate to said sol to complete neutralization of the alumina compound and cause gelation of the resulting alumina and purifying and drying the resulting gel.

A significant advantage is this process is that the principal neutralizing agent is lime rock which is an abundant and inexpensive raw material. A further advantage which is gained in the use of lime rock is that the reaction product formed when calcium carbonate is added to alum solutions is calcium sulfate. The latter being completely insoluble in water lends itself readily to removal by filtration.

In carrying out the process an aqueous slurry of calcium carbonate is added to an alum solution in amount which is insufficient to completely neutralize the alum. Since alum solutions are prepared by dissolving alumina in sulphuric acid the solution generally contains 1–2% sulphuric acid. The calcium carbonate is preferably ground to a finely divided form for intimate contact with the alum. The addition of calcium carbonate is stopped at a pH below that at which any alumina precipitate is formed. This has been found to be at a pH of not exceeding 3.5 using an alum solution containing 94 g./l. $Al_2O_3$ at a temperature below 110° F. To carry out the calcium carbonate addition to a pH above about 3.5 would result in the formation of an unstable sol. Under the prescribed conditions, not less than 35% and up to 50% of the alum is neutralized while at the same time all of the alumina remains in solution as a basic aluminum sulfate sol.

Following the addition of the requisite amount of calcium carbonate, the basic aluminum sulfate sol is separated by suitable means, such as filtration, from the precipitated calcium sulfate and recovered as the filtrate for further processing. A significant feature of this process is the facility by which appreciable amounts of a principal impurity, that is, the sulfate ion, is removed.

Following removal of the calcium sulfate, sodium carbonate solution is added to the basic aluminum sulfate sol in the second neutralization stage to effect gelation thereof. This occurs at a pH of 4.3. The gelled alumina is permitted to age for a short period of about 15 to 30 minutes to allow evolution of carbon dioxide. Following the aging period, an additional amount of sodium carbonate solution is added to the gelled alumina to a pH value of between about 5.0–6.5. Experience has shown that a pH of at least 5.0 is required to obtain a dried product which when reslurried with water with subsequent washings will possess a pH above the minimum of 4.3. The addition of sodium carbonate is to compensate for the loss of hydrogen ions by adsorption by the alumina during processing. Addition of sodium carbonate solution to give a dried product having a pH greater than 6.5 is also to be avoided because the use of sodium carbonate to obtain the higher pH values tends to increase the macropores and lower the density of the washed product below desirable levels.

A further advantage in the use of calcium carbonate is realized in the recovery of gaseous carbon dioxide which is evolved in the process. It may be used as a reagent in neutralizing sodium silicate solutions to prepare silica-alumina hydrocarbon cracking catalysts as described in U.S. Patent No. 2,886,512.

Following the addition of sodium carbonate to form the alumina gel, the slurry may be filtered and the recovered gel particles are then dried. In a preferred embodiment the slurry is fed directly to the spray dried to form microspheroidal particles without first filtering the slurry. As a precaution against undue hydrolysis, dispersion, and peptization, the spray dried product is cooled to room temperature prior to washing. Decantation washing is preferred over continuous filtration washing methods because the longer soaking time involved at the high pH is desirable for the removal of sulfate impurities. Washing is preferably carried out with deionized water heated to a temperature of about 110° F. to 130° F. with the pH of the solution adjusted to 9.0–9.5 by the addition of ammonia. After soda and sulfates have been reduced to desirable levels of 0.04% and 2.0% maximum, respectively, the free water is then filtered off. The purified particles are then redried by any suitable method or the product may be spray dried directly in slurry form.

The invention is further illustrated by the following example:

To 161¼ pounds of alum solution at 90° F. and containing 94 g./l. $Al_2O_3$ and 14.1 g./l. free $H_2SO_4$ (that is, excess $H_2SO_4$ over the $Al_2O_3$ which is combined as $Al_2(SO_4)_3$), there were added 18½ pounds of finely divided calcium carbonate as a 50–50 slurry with water until a pH of 3.5 was reached and the calcium carbonate addition was stopped. The resulting calcium sulfate was filtered off and the basic aluminum sulfate sol was recovered as the filtrate. To 35 pounds of the basic aluminum sulfate sol there were then added 4.8 liters of 20% sodium carbonate solution until a pH of 5.1 was reached and thereby form a slurry of alumina gel particles. This slurry was then passed directly into a spray drier and the dried products recovered and re-slurried with water to obtain a pH of 4.3. The slurry was then washed by decantation using deionized water heated to 130° F. with the pH adjusted to 9.5 by the addition of ammonia solution. The washed product was then filtered free with water and then dried at 300° F.

Analysis of the chemical and physical properties of the alumina gel prepared according to the preceding example is as follows:

| | |
|---|---|
| $Na_2O$ percent | 0.027 |
| $SO_4$ do | 0.41 |
| CaO do | 0.041 |
| Surface area (after 3 hrs. at 1000° F.) m.²/g | 322 |
| Pore volume: | |
| Water cc./g. | 0.74 |
| Nitrogen (BET method) cc./g. | 0.67 |

From the foregoing results, it will be noted that the process of this invention permits preparation of alumina gels having low soda and sulfate impurities and high surface areas and pore volumes. Such gels are exceptionally useful as adsorbents or as catalysts or catalyst supports in hydrocarbon conversion processes.

We claim:

1. A process for preparing alumina gels which comprises contacting an aluminum sulfate solution with calcium carbonate to form a basic aluminum sulfate sol at a pH not exceeding 3.5, commingling with said sol sufficient sodium carbonate solution and thereby form an alumina gel, and washing said gel to remove soluble impurities and drying said gel.

2. A process for preparing alumina gels which comprises contacting an aluminum sulfate solution with an aqueous slurry of finely divided calcium carbonate to form a mixture of calcium sulfate and a basic aluminum sulfate sol and at a pH not exceeding 3.5, separating the sol from said mixture, commingling the sol with sufficient sodium carbonate solution to attain a pH between 4.3 and 6.5 and thereby form an alumina gel, and washing said gel to remove soluble impurities and drying said gel.

3. A process for preparing alumina gels which comprises contacting an aluminum sulfate solution with an aqueous slurry of finely divided calcium carbonate to form a mixture of calcium sulfate and a basic aluminum sulfate sol and at a pH not exceeding 3.5, separating the sol from said mixture, commingling the sol with sufficent sodium carbonate solution to attain a pH of about 4.3 and thereby form an alumina gel, aging said gel, adding to the aged gel additional sodium carbonate solution to attain a pH of between about 5.0 and 6.5, and drying, washing said gel to remove soluble impurities and redrying the purified gel.

4. A process for preparing alumina gels which comprises contacting an aluminum sulfate solution with an aqueous slurry of finely divided calcium carbonate to form a mixture of calcium sulfate and a basic aluminum sulfate sol and at a pH of about 3.5, separating the sol from said mixture, commingling the sol with sufficient sodium carbonate solution to attain a pH of about 4.3 and thereby form an aqueous slurry containing alumina gel particles, aging said slurry, adding to the aged slurry additional sodium carbonate solution to attain a pH of between about 5.0 and 6.5, spray drying said slurry to form microspheroidal alumina gel particles, washing said gel to remove soluble impurities and redrying the purified particles.

5. A process according to claim 4 wherein the spray dried particles are purified by washing with an ammoniacal solution heated at a temperature of about 100° F. to about 130° F. and having a pH of about 9.0 to 9.5.

6. A process for preparing alumina gels which comprises contacting an aluminum sulfate solution with a sufficient amount of an aqueous slurry of finely divided calcium carbonate to form a mixture of calcium sulfate and a basic aluminum sulfate sol and at a pH of 3.5, separating the sol from said mixture, commingling said sol with sufficient 20% sodium carbonate solution to a pH of 5.1 and thereby form a slurry of alumina gel particles, spray drying said slurry, purifying the dried particles with an ammoniacal solution at a temperature of 130° F. and a pH of 9.5, and redrying the purified particles at 300° F.

References Cited in the file of this patent

UNITED STATES PATENTS 2,898,306    Cramer et al. _____ Aug. 4, 1959

OTHER REFERENCES

Mellor, J. W.: "A Comprehensive Treatise on Inorganic and Theoretical Chemistry," vol. 5, Longmans Green and Co., New York, 1925, page 338.